(12) United States Patent
Kotzor et al.

(10) Patent No.: US 12,523,485 B2
(45) Date of Patent: Jan. 13, 2026

(54) PROVIDING A ROUTE-SPECIFIC SERVICE TO A USER OF A VEHICLE IN ACCORDANCE WITH A PREDICTED NAVIGATION ROUTE

(71) Applicant: Bayerische Motoren Werke Aktiengesellschaft, Munich (DE)

(72) Inventors: Daniel Kotzor, Seefeld (DE); Stefan Holder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 18/566,056

(22) PCT Filed: Apr. 27, 2022

(86) PCT No.: PCT/EP2022/061166
§ 371 (c)(1),
(2) Date: Nov. 30, 2023

(87) PCT Pub. No.: WO2023/274600
PCT Pub. Date: Jan. 5, 2023

(65) Prior Publication Data
US 2024/0247940 A1    Jul. 25, 2024

(30) Foreign Application Priority Data
Jun. 30, 2021  (DE) .................... 10 2021 116 789.2

(51) Int. Cl.
*G01C 21/36*  (2006.01)
(52) U.S. Cl.
CPC ............................ *G01C 21/3617* (2013.01)
(58) Field of Classification Search
CPC .......................... A01B 51/026; A01B 59/002
See application file for complete search history.

(56) References Cited

U.S. PATENT DOCUMENTS

2010/0106603 A1  4/2010  Dey et al.
2011/0238289 A1*  9/2011  Lehmann ........... G01C 21/3617
                                                          701/533
(Continued)

FOREIGN PATENT DOCUMENTS

DE  102011075351 A1  11/2012
EP      3871911 A1   9/2021

OTHER PUBLICATIONS

International Search Report corresponding to International Patent Application No. PCT/EP2022/061166, dated Aug. 12, 2022 (4 pages).

(Continued)

*Primary Examiner* — Ramsey Refai
(74) *Attorney, Agent, or Firm* — Maginot, Moore & Beck LLP

(57) ABSTRACT

A method provides a route-specific service to a user of a vehicle. The method includes receiving a set of driven navigation routes of the vehicle, and identifying navigation route clusters using the set of driven navigation routes. The method also includes training a machine learning method using the identified navigation route clusters as training data. The method further includes receiving a characteristic of a current journey of the vehicle, and predicting a probability for each identified navigation route cluster of the vehicle depending on the received characteristic, using the trained machine learning method. A navigation route cluster with the highest predicted probability is identified, and the route-specific service is provided to the user of the vehicle for the current journey if the navigation route cluster with the highest predicted probability has a probability value that exceeds a predetermined threshold.

19 Claims, 4 Drawing Sheets

(56) References Cited

U.S. PATENT DOCUMENTS

| | | | |
|---|---|---|---|
| 2012/0265433 A1* | 10/2012 | Viola | G01C 21/362 |
| | | | 701/410 |
| 2015/0160023 A1 | 6/2015 | Goel et al. | |
| 2017/0364821 A1 | 12/2017 | Mathur et al. | |
| 2019/0186939 A1 | 6/2019 | Cox et al. | |
| 2020/0103244 A1* | 4/2020 | Cella | G05D 1/0212 |
| 2022/0034668 A1* | 2/2022 | Hu | G01C 21/3617 |
| 2023/0375351 A1* | 11/2023 | Palanisamy | G01C 21/3484 |

OTHER PUBLICATIONS

Written Opinion corresponding to International Patent Application No. PCT/EP2022/061166, dated Aug. 12, 2022 (6 pages).

German Search Report corresponding to German Patent Application No. 10 2021 116 789.2, dated Nov. 26, 2021. (6 pages).

L. Nack et al.: "Acquisition and Use of Mobility Habits for Personal Assistants", 2015 IEEE 18th International Conference on Intelligent Transportation Systems, 2015, pp. 1500-1505, doi: 10.1109/ITSC. 2015.245.

Yue Dai et al.: "Dynamic prediction of drivers' personal routes through machine learning", 2016 IEEE Symposium Series on Computational Intelligence (SSCI), 2016, pp. 1-8, doi: 10.1109/SSCI.2016.7850094.

\* cited by examiner

PROVIDING A ROUTE-SPECIFIC SERVICE TO A USER OF A VEHICLE IN ACCORDANCE WITH A PREDICTED NAVIGATION ROUTE

The present application is the U.S. national phase of PCT Application PCT/EP2022/061166 filed on Apr. 27, 2022, which claims priority of German patent application No. 102021116789.2 filed on Jun. 30, 2021, which is incorporated herein by reference in its entirety.

TECHNICAL FIELD

The invention relates to methods and apparatus for providing a route-specific service to a user of a vehicle.

BACKGROUND

Methods are known from the prior art that maximize the hit frequency of an estimated route. The estimated route should correspond as often as possible to an actual route. The estimated route can be displayed as a suggested route to a user of a vehicle.

It is therefore an object to provide a route-specific service to a user of a vehicle more efficiently. Moreover, it is an object of at least some embodiments to predict a navigation route more efficiently and to provide a route-specific service to a user of the vehicle depending on the predicted navigation route.

SUMMARY

The above-stated objects, as well as others, are achieved by advantageous designs and developments discussed herein.

A first aspect is characterized by a method for providing a route-specific service to a user of a vehicle. The method can be a computer-implemented method and/or a control unit-implemented method. The vehicle may be a motor vehicle. The route-specific service may include route-specific traffic information, a route suggestion, and/or a route-specific message to a user of the vehicle. The method involves receiving a set of driven navigation routes of the vehicle. The driven navigation routes can be stored by the vehicle. The method can use the stored navigation routes of one or more users of the vehicle. The method includes identifying navigation route clusters using the set of driven navigation routes of the vehicle and training a machine learning method using the identified navigation route clusters as training data.

The method also includes receiving a characteristic of a current journey of the vehicle and predicting a probability for each identified navigation route cluster of the vehicle depending on the received characteristic of the current journey of the vehicle using the trained machine learning method. Furthermore, the method includes identifying a navigation route cluster with the highest predicted probability, and providing the route-specific service to the user of the vehicle for the current journey of the vehicle if the navigation route cluster with the highest predicted probability has a probability value that exceeds a predetermined threshold value.

Advantageously, the method can provide a route-specific service without the navigation route being predetermined by the user of the vehicle and/or the user having to operate a navigation system of the vehicle. As a result, route-relevant information can be proactively provided to the user by the route-specific service. The vehicle can efficiently assist the user during a journey with the vehicle by providing relevant information to the user without the user having to actively perform any operating action.

According to one arrangement, the set of driven navigation routes may include the set of driven navigation routes of a user of the vehicle, and/or the set of driven navigation routes may include driven navigation routes of all users of the vehicle. This can be used to efficiently manage the provision of a route-specific service to one or all users of the vehicle.

According to some embodiments, a navigation route cluster can be representative of one or more traveled navigation routes from the set of traveled navigation routes, the distance of which has a maximum predetermined distance. In particular, a navigation route cluster can be representative of driven navigation routes for which a distance between each two navigation routes has a predetermined maximum distance. For example, the maximum distance can be specified in a DBSCAN clustering algorithm. This can be used to summarize similar navigation routes.

According to one or more embodiments, a cost function can be used during the training of the machine learning method, with which the adjustment of hyperparameters of the machine learning method by a hyperparameter optimization method is evaluated. This allows the machine learning method to be adjusted efficiently.

In addition, in some embodiments, the hyperparameters of the machine learning method can be adjusted until a preferably global maximum of the cost function is achieved. This allows the machine learning method to be adjusted efficiently.

According to one or more arrangements, the cost function can evaluate the adjustment of the hyperparameters of the machine learning method by means of two parameters, and/or a first parameter may be representative of a display frequency or a provision frequency of the route-specific service, and/or a second parameter may be representative of a prediction accuracy of the predicted probability. This allows the machine learning method to be adjusted efficiently.

According to a further refinement, the identification of a navigation route cluster with the highest predicted probability includes an identification of navigation route clusters with the n highest predicted probabilities, with n=1, 2, 3. Alternatively, or in addition, the route-specific service can be provided for the navigation route clusters with the n highest predicted probabilities. This allows multiple selection options to be efficiently provided to the user of the vehicle.

Another aspect is characterized by a computer-readable medium for providing a route-specific service to a user of a vehicle, wherein the computer-readable medium contains instructions which, when executed on a computer and/or a control unit, carry out the method described above.

Another aspect is a system for providing a route-specific service to a user of a vehicle, wherein the system is designed to perform the method described above.

Another aspect is a vehicle containing the system described above for providing a route-specific service to a user of a vehicle.

Another aspect is a mobile terminal device containing the above-described system for providing a route-specific service to a user of a vehicle.

Further characteristics arise from the claims, the figures and the description of the figures. All characteristics and combinations of characteristics mentioned above in the description, as well as the characteristics and combinations of characteristics mentioned below in the description of the figures and/or shown in the figures alone, can be used not only in the combination specified in each case, but also in other combinations or on their own.

In the following, an exemplary embodiment is described on the basis of the attached drawings. This results in further details, preferred arrangements and developments.

DETAILED DESCRIPTION

Figure 1:
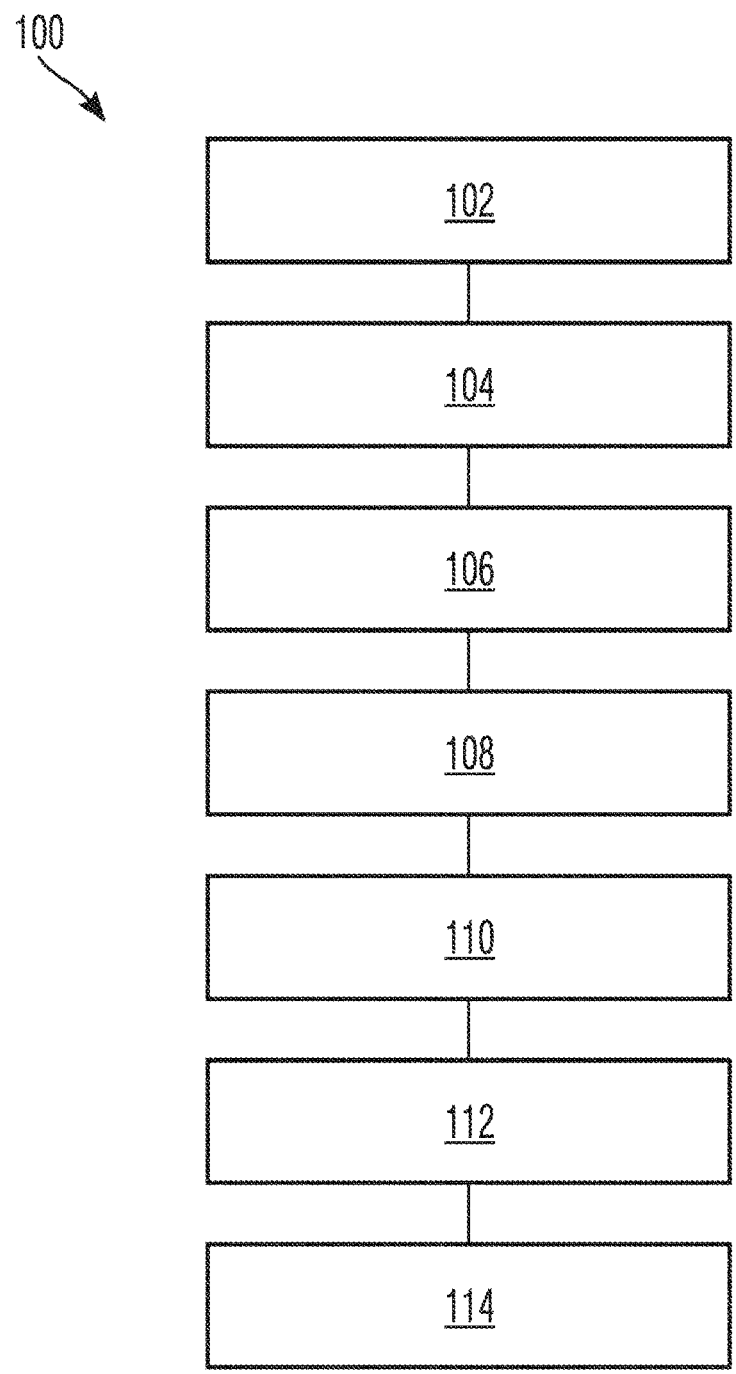
FIG. 1 shows in detail and schematically an exemplary method for providing a route-specific service to a user of a vehicle.

FIG. 1 shows in detail an exemplary method 100 for providing a route-specific service to a user of a vehicle. The method 100 provide one or more route-specific services to the users of the vehicle without explicitly knowing the navigation route. For example, the method 100 can provide the user of the vehicle with congestion information on a predicted navigation route and/or suggest alternative navigation routes without the user of the vehicle driving with active navigation. In other words, the method 100 can offer route-specific services to the user of the vehicle, which are currently only available when navigation is activated in a navigation system. The method 100 can be carried out continuously and/or at predetermined times or time intervals during a journey to re-provide and/or update the route-specific service. Furthermore, the user can transfer a predicted navigation route to the navigation system of the vehicle in order to activate route guidance based on the indicated navigation route and continue to use the route-specific service when the route guidance is activated. The provision of the route-specific service should not distract the user of the vehicle from the driving task, so that the route-specific service is only provided if the navigation route can be predicted with sufficient certainty, i.e., a predicted probability of the navigation route exceeds a predetermined threshold value. In addition, the route-specific service can carry out preconditioning of vehicle components, for example in the event of an imminent ascent. Furthermore, the route-specific service can be a driver assistance function that uses a predicted navigation route as the most probable path to provide the driver assistance function to the user.

The method 100 can receive 102 a set of driven navigation routes of the vehicle and use the set of driven navigation routes of the vehicle to identify navigation route clusters 104. Due to inaccuracies in determining the position of the vehicle and other position inaccuracies during a journey with the vehicle, for example due to lane changes, overtaking maneuvers, evasive maneuvers, and/or other driving maneuvers, two driven navigation routes between the same starting point and destination may be different. To determine a difference between two driven navigation routes, a distance between two navigation routes can be defined. By using the definition of the distance between two navigation routes, it is possible to cluster traveled navigation routes into navigation route clusters that combine driven navigation routes. By identifying navigation route clusters, the correctness of a predicted navigation route can be increased efficiently.

For example, the spacing of navigation routes can be defined with the following metric:
1) The distance of a geocoordinate from a route T can be defined as the minimum distance in meters from any point p on the route to this point:

$$d(p, T) := \mathrm{argmin}_{p\star \in T}(d(p, p^\star)).$$

2) The intersection of two routes $T_1$ and $T_2$, $I(T_1,T_2)$ can be defined by the set of points of all points on $T_1$ whose distance from $T_2$ is less than a threshold value $\{p \in T_1 | d(p,T_2) < d_{max}\}$ with for example $d_{max}=300$ m.
3) The relative intersection of a route $T_1$ with $T_2$, $r(T_1, T_2)$ can be defined as the ratio between the measurable length of $I(T_1,T_2)$ and the mean total lengths of $T_1$ and $T_2$:

$$r(T_1, T_2) := \frac{2l(I(T1, T2))}{(l(T1) + l(T2))}$$

4) The distance between the routes $T_1$ and $T_2$ can be defined as $d(T_1, T_2)=(1-r(T_1, T_2))/(r(T_1, T_2))$ The metric can also be applied when the navigation route is defined as a sequence of road segments.

Figure 2:
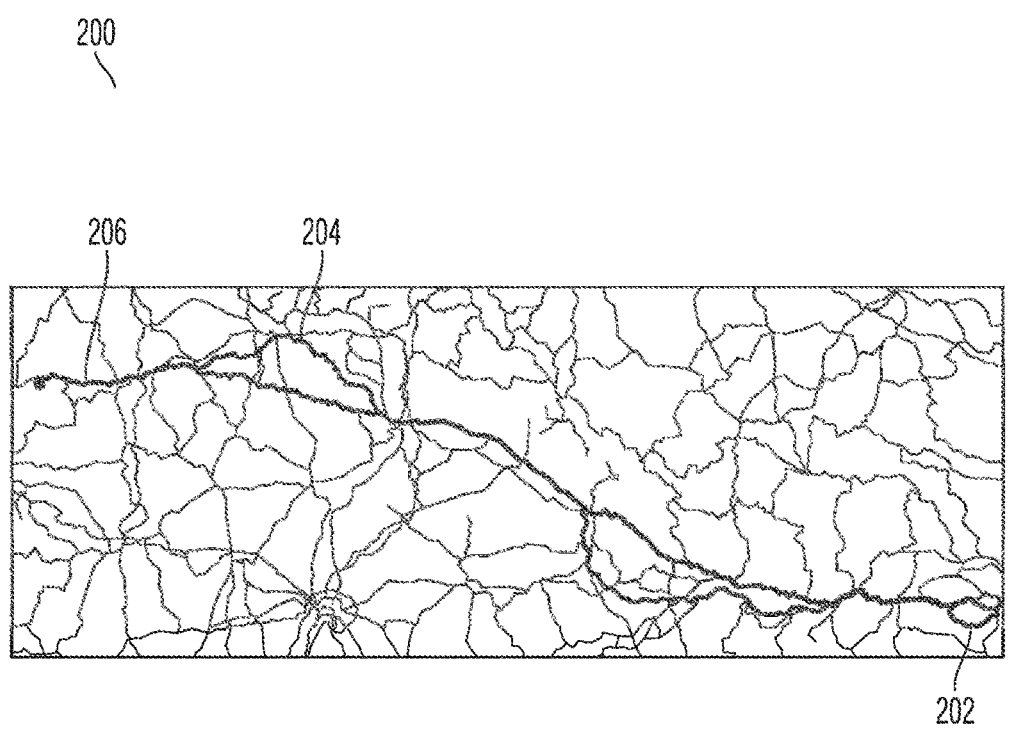
FIG. 2 shows in detail and schematically an example of a distance between navigation routes.

FIG. 2 shows an example 200 of a distance between navigation routes. The map of FIG. 2 shows a driven navigation route 202 $T_d$, a fastest navigation route 204 $T_f$, and a shortest navigation route 206 $T_s$. The relative intersection between the traveled navigation route 202 and the fastest navigation route 204 is $r(T_d,T_f)=96\%$. The relative intersection between the driven navigation route 202 and the shortest navigation route 206 is $r(T_d, T_s)=51\%$. The distance to the fastest navigation route 204 is $d(T_d, T_f)=0.04/0.96 \approx 0.04$ and the distance to the shortest navigation route 206 $d(T_d,T_f)=0.49/0.51 \approx 0.96$.

The method 100 also includes training 106 of a machine learning method using the identified navigation route clusters as training data. For example, the machine learning can be logistic regression, support vector machine (SVM), random forest, artificial neural networks, boosting or the K-nearest-neighbor algorithm. Each of these exemplary machine learning methods comprises a predetermined number of hyperparameters. For random forest, there are the following hyperparameters for the training:
  number of trees,
  gini criterion or entropy criterion for measuring a quality of divisions,
  maximum tree depth,
  minimum number of examples needed to divide a node,
  minimum number/minimum proportion of examples in the leaves of the trees,
  number of characteristics used to create a tree,
  maximum number of tree nodes,
  minimal decrease in impurity for a division,
  impurity threshold value which determines when the tree growth will be stopped, and
  use of bootstrapping.

During the training of the machine learning method, a cost function can be maximized with the hyperparameters of the machine learning method. For this purpose, as described above, the driven navigation routes can be combined into navigation route clusters. Using the metric described above to determine the distance of navigation routes, a DBSCAN algorithm or agglomerative clustering can be used to identify the navigation route clusters. The navigation route clusters can be used as data for training and testing the machine learning algorithm. For example, navigation route clusters can be divided into training data and test data. Preferably, 80% of the data can be used as training data and 20% of the data as test data. Alternatively, the data can be divided into training data and test data by means of rolling cross-validation.

The quality of the trained machine learning method can be measured with the cost function. In order to efficiently find the optimal hyperparameters in terms of cost function, an algorithm for hyperparameter optimization can be used such as raster search, random search or Bayesian optimization. Optimization of hyperparameters can be further accelerated by using a representative sample of users, for example 1000 randomly selected users.

Figure 3:
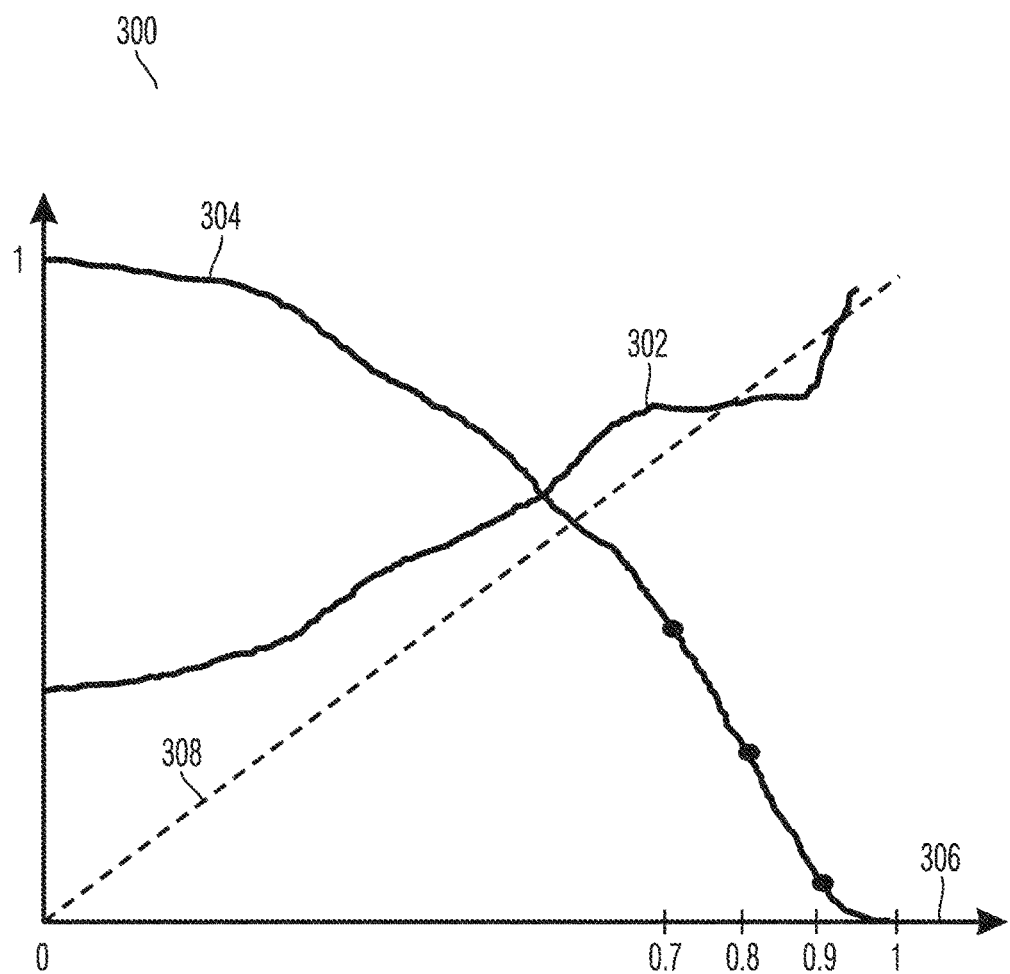
FIG. 3 shows in detail and schematically an exemplary diagram of a display frequency and a precision for different threshold values.

In order to calculate the cost function, the first step is to calculate the parameters precision and display frequency for different probability threshold values. FIG. 3 shows a graph 300 for an example of the precision 302 profile and display frequency 304 profile for different probability threshold values 306. The expected minimum precision is 308. The display frequency indicates a proportion of all navigation route clusters, the probabilities of which are greater than or equal to the respective probability threshold value. The precision indicates a proportion of all correctly predicted probabilities of the navigation route clusters. For this purpose, it is possible to check for each predicted navigation route cluster whether the indicated navigation route cluster and the actually driven navigation route are the same. For checking whether the predicted navigation route cluster matches the actually driven navigation route, the metric described above for determining a distance between two navigation routes can be used.

Figure 4:
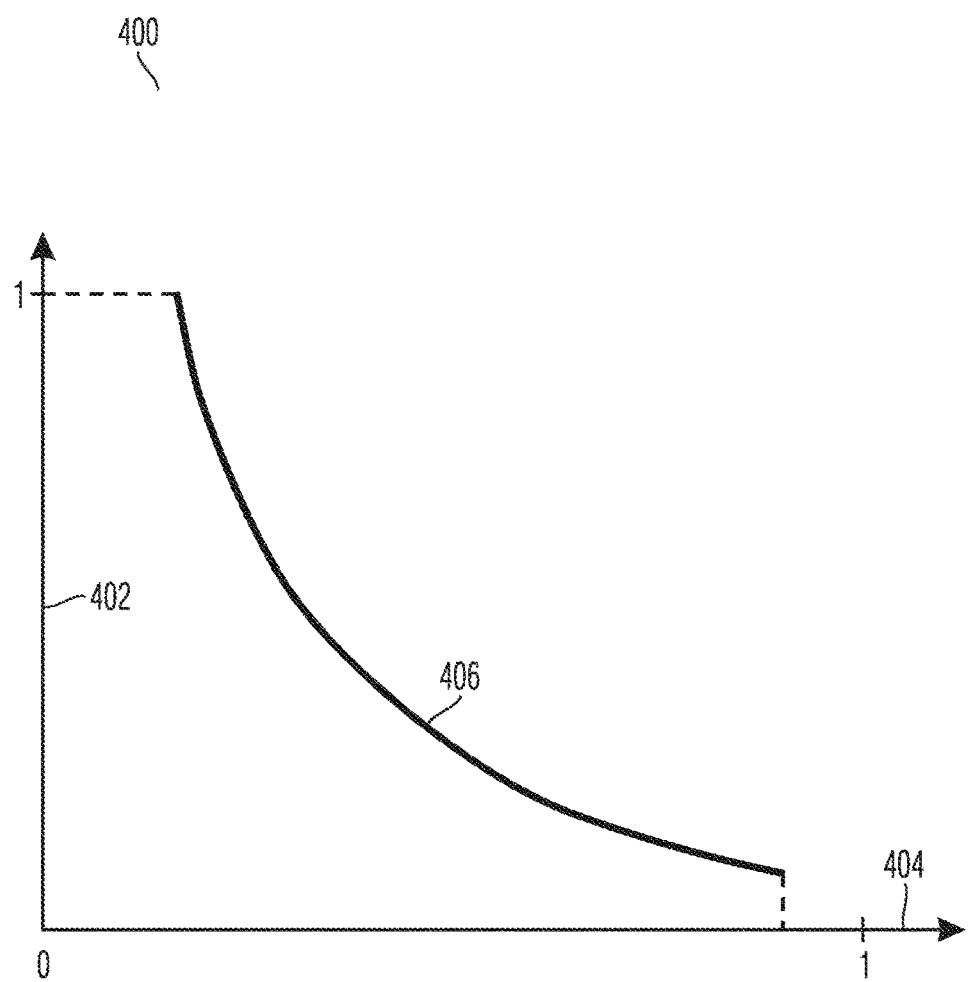
FIG. 4 shows in detail and schematically an exemplary diagram of a dependency between the display frequency and the precision.

FIG. 4 shows an exemplary diagram 400 of a dependency between the display frequency 402 and the precision 404. The diagram 400 shows the display frequency 402 as a function of the precision 404. For example, the curve 406 can be derived from the pairs of display frequency and precision values shown in the diagram 200.

Referring to the diagram 400, various cost functions can be used to evaluate the display frequency and the precision of predicted probabilities of navigation route clusters:

1) Display frequency for a fixed precision value, for example, 0.7,
2) Area under the display frequency-precision curve from the diagram 400 over an entire range of precision values, or
3) Area under the display frequency-precision curve from the diagram 400 over a fixed range of precision values, for example, between 0.5 and 0.8.

Variant 1) of the cost function is preferably used for evaluating the predicted probability of a navigation route cluster. Variants 2) and/or 3) can be used to leave open a definition of a precision during an adjustment of the hyperparameters. For example, the precision can be dynamically adjusted at a later point in time by a user of the vehicle and/or based on feedback from the user of the vehicle without the need to adjust the machine learning method and/or the hyperparameters of the machine learning method at a later date. The machine learning method can be trained at predefined regular intervals in order to take into account new navigation route clusters during training. The optimization of hyperparameters can be suspended when the machine learning method is retrained in order to reduce the computational power for retraining the machine learning method. The machine learning method can be trained on a computer or a control unit of the vehicle and/or a server outside the vehicle.

The method 100 can receive one or more characteristics of a current journey of the vehicle. In detail, the following characteristics can be used to predict the route:

vehicle position at the start of a current journey;
vehicle location at the start of a current journey;
vehicle positions at the beginning of a current journey and of n last journeys, wherein n=1, 2, 3, 4, . . . ;
vehicle locations at the beginning of a current journey and of n last journeys, wherein n=1, 2, 3, 4, . . . ;
time of day;
absolute time, for example number of seconds since Jan. 1, 1970 00:00
day of the week;
seat occupancy; and/or
current vehicle position and/or n last vehicle positions during a current journey.

Furthermore, the method 100 can predict 110 a probability for each identified navigation route cluster of the vehicle depending on the received characteristic of the current journey of the vehicle using the trained machine learning method and can identify 122 a navigation route cluster with the highest predicted probability. A predicted navigation route corresponds to the navigation route cluster with the highest probability. In order to predict a predicted navigation route as an actual driving route, the predicted navigation route can be mapped onto a navigation map by means of map matching.

Finally, the method 100 can provide 114 the route-specific service to the user of the vehicle for the current journey of the vehicle if the navigation route cluster with the highest predicted probability exceeds a predetermined threshold value. When deciding whether the route-specific service will be provided to the user, a threshold value may be set for all users or a user-specific threshold value may be used. Preferably, in variant 1) of the cost function, the threshold value corresponds to the precision for which the display frequency has been optimized.

REFERENCE SIGN LIST

100 method
102 receiving a first set of driven navigation routes
104 identifying navigation route clusters
106 training a machine learning method
108 receiving a characteristic of a current journey of the vehicle
110 predicting a probability for each identified navigation route cluster of the vehicle
112 identifying a navigation route cluster with the highest predicted probability
114 providing the route-specific service to the user of the vehicle for the current journey of the vehicle
200 example of navigation routes
202 driven navigation route
204 fastest navigation route
206 shortest navigation route
300 diagram
302 precision 304 display frequency
306 probability threshold values
308 expected minimum precision
400 diagram
402 display frequency
404 precision
406 precision-display frequency curve

The invention claimed is:

1. A method for providing a route-specific service to a user of a vehicle, the method including:
receiving a set of driven navigation routes of the vehicle;
identifying navigation route clusters using the set of driven navigation routes of the vehicle;
training a machine learning method using the identified navigation route clusters as training data;
receiving a characteristic of a current journey of the vehicle;
predicting a probability for each identified navigation route cluster of the vehicle depending on the received characteristic of the current journey of the vehicle using the trained machine learning method;
identifying a navigation route cluster with the highest predicted probability;
providing the route-specific service to the user of the vehicle for the current journey of the vehicle if the navigation route cluster with the highest predicted probability has a probability value that exceeds a predetermined threshold value.

2. The method as claimed in claim 1, wherein the set of driven navigation routes includes driven navigation routes of a user of the vehicle.

3. The method as claimed in claim 1, wherein the set of driven navigation routes contains driven navigation routes of all users of the vehicle.

4. The method as claimed in claim 1, wherein at least one navigation route cluster is representative of one or more driven navigation routes from the set of driven navigation routes, the distance of which is less than or equal to a maximum, predetermined distance.

5. The method as claimed in claim 1, wherein a cost function is used during the training of the machine learning method, with which an adjustment of hyperparameters of the machine learning method is evaluated by a hyperparameter optimization method.

6. The method as claimed in claim 5, wherein at least one navigation route cluster is representative of one or more driven navigation routes from the set of driven navigation routes, the distance of which is less than or equal to a maximum, predetermined distance.

7. The method as claimed in claim 5, wherein the hyperparameters of the machine learning method are adjusted until a preferably global maximum of the cost function is reached.

8. The method as claimed in claim 7, wherein the cost function evaluates the adjustment of the hyperparameters of the machine learning method by means of at least two parameters.

9. The method as claimed in claim 8, wherein a first parameter of the at least two parameters is representative of a display frequency or a frequency of provision of the route-specific service.

10. The method as claimed in claim 9, wherein at least one navigation route cluster is representative of one or more driven navigation routes from the set of driven navigation routes, the distance of which is less than or equal to a maximum, predetermined distance.

11. The method as claimed in claim 9, wherein a second parameter of the at least two parameters is representative of a prediction accuracy of the predicted probability.

12. The method as claimed in claim 8, wherein one of the at least two parameters is representative of a prediction accuracy of the predicted probability.

13. The method as claimed in claim 1, wherein the identification of a navigation route cluster with the highest predicted probability involves an identification of navigation route clusters with the n highest predicted probabilities, with n=1, 2, 3.

14. The method as claimed in claim 1, wherein the route-specific service is provided for the navigation route clusters with the n highest predicted probabilities.

15. A computer-readable medium for providing a route-specific service to a user of a vehicle, wherein the computer-readable medium contains instructions which, when executed on a computer or a control unit, carry out the method as claimed in claim 1.

16. A system for providing a route-specific service to a user of a vehicle, wherein the system is designed to carry out the method as claimed in claim 1.

17. A vehicle containing the system for providing a route-specific service to a user of a vehicle as claimed in claim 16.

18. A mobile terminal containing the system for providing a route-specific service to a user of a vehicle as claimed in claim 16.

19. The method of claim 1 wherein the navigation route cluster having the highest predicted probability corresponds to a predicted navigation route, and wherein providing the route-specific service further comprises at least one of the group consisting of:
using the vehicle to communicate to the user traffic congestion information for the predicted navigation route;
using the vehicle to communicate to the user at least one suggestion for an alternative navigation route;
preconditioning vehicle components for an upcoming road condition of the predicted navigation route; and
operating vehicle components to perform a driver assistance function based on the predicted navigation route based on the navigation route cluster with the highest predicted probability.

* * * * *